3,427,954
APPARATUS FOR PROVIDING HEAT OF STERILIZATION IN PROCESSES OF CANNING FOOD MATERIAL
Marshall Long, Leawood, Kans., assignor, by mesne assignments, to Carnation Company, Los Angeles, Calif., a corporation of Delaware
Filed Mar. 18, 1966, Ser. No. 535,477
U.S. Cl. 99—251   5 Claims
Int. Cl. B65b 55/06; A23c 3/00; B05b 7/02

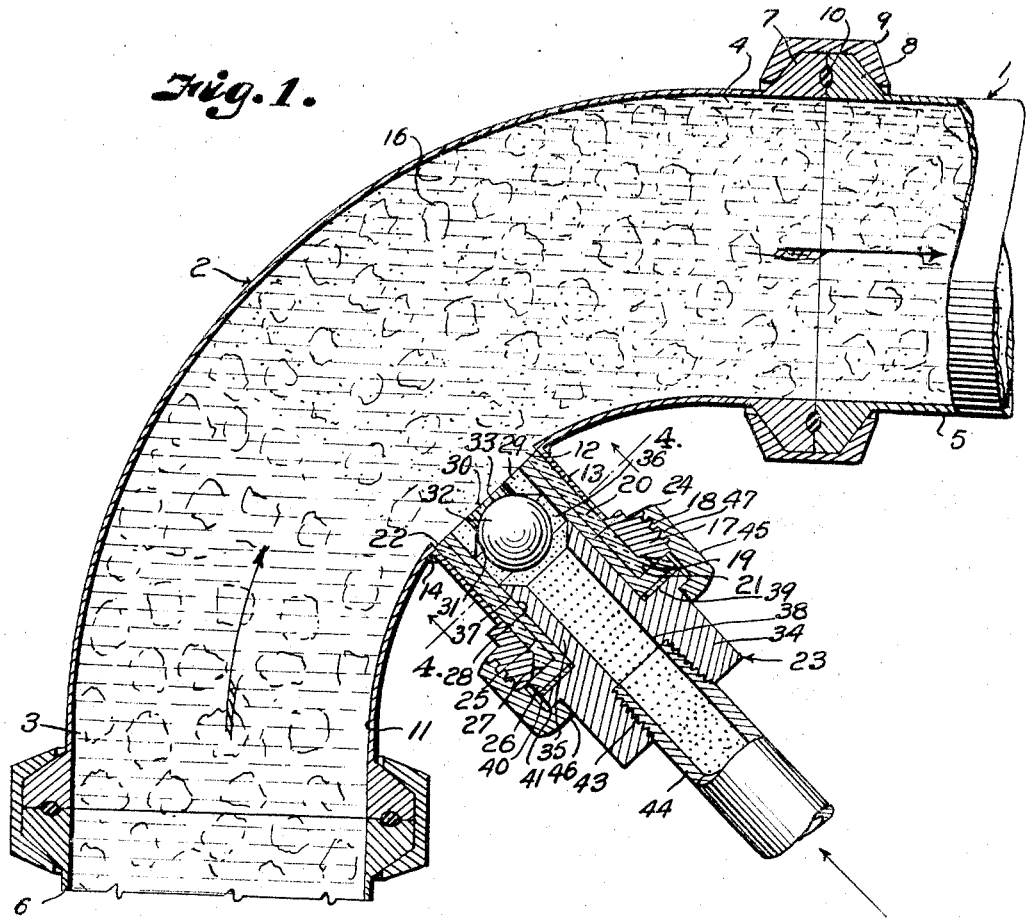
Fig. 1.
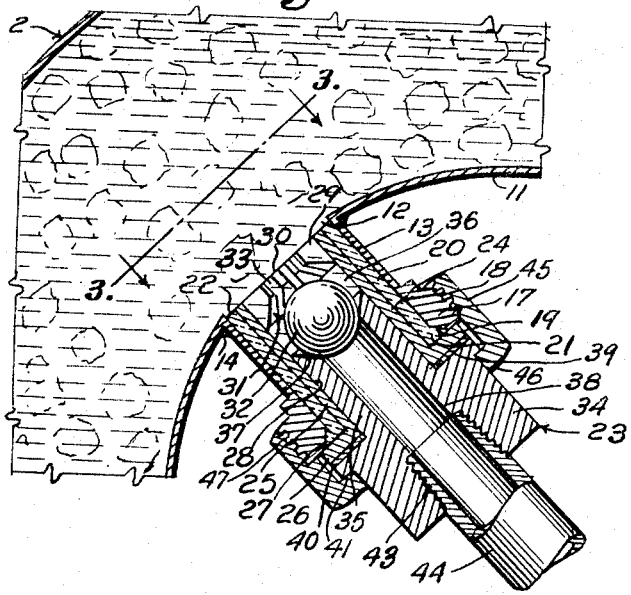
Fig. 2.
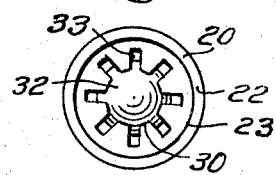
Fig. 3.
Fig. 4.
INVENTOR.
Marshall Long.
BY
Paul E. Mullendore
ATTORNEY

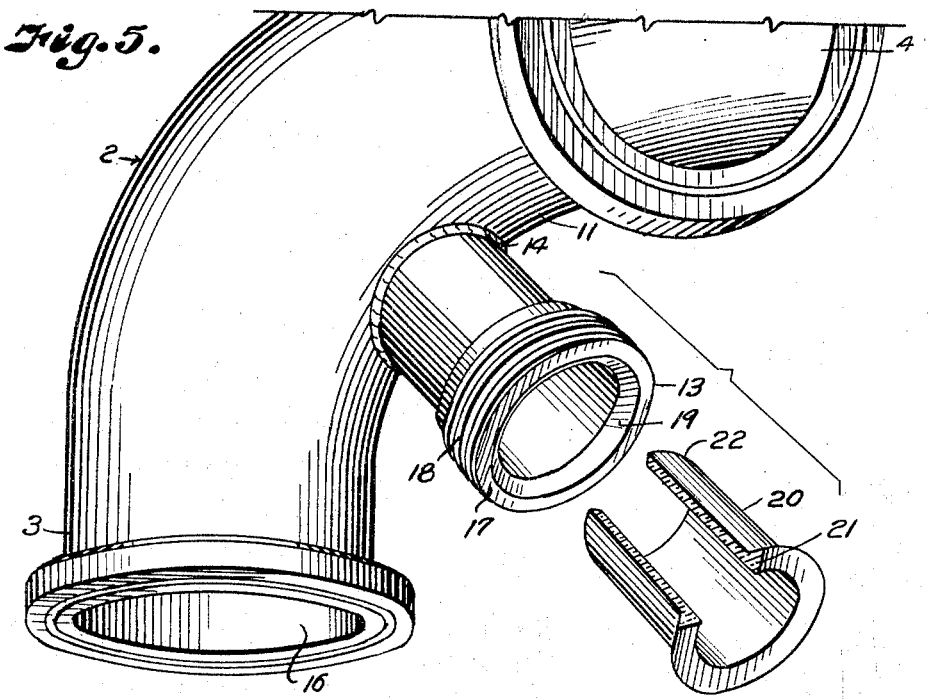
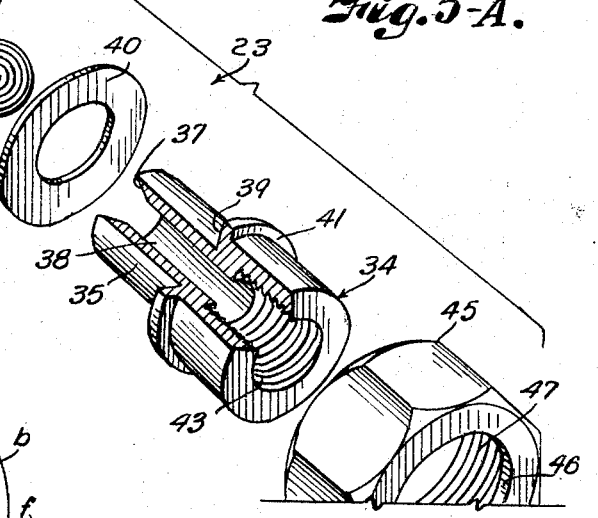
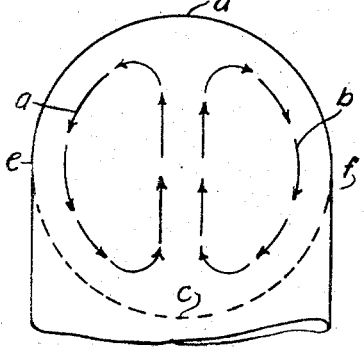
INVENTOR.
Marshall Long.
BY
Paul E. Mullendore
ATTORNEY United States Patent Office 3,427,954
Patented Feb. 18, 1969

ABSTRACT OF THE DISCLOSURE

A continuous food sterilizer comprising a bent conduit through which the food is pumped and a steam injection nozzle mounted on the inside of the bend flush with the inside surface of the conduit. The turbulence of the food incident to its passage through the bent conduit facilitates mixture of the food and injected steam.

---

This invention relates to an improved apparatus for providing heat of sterilization in processes of canning food material, particularly in processes of the type described and illustrated in the Schack et al., Patent No. 3,232,770, issued Feb. 1, 1966.

The Schack, et al. patent teaches a process for continuously sterilizing and subsequently canning food products at high temperatures and superatmospheric pressures, wherein the heat for sterilization, or at least the major portion thereof, is supplied through introduction of steam into the formula, or at least into components thereof, the steam being injected directly into the food material while it is being forced through a conduit.

In processes of this type, it is difficult to introduce the steam uniformly through the closely packed food material while under flow in a conduit. Also, the steam condenses prior to entering the product. Therefore, it has been the practice to extend the steam nozzles into the conduit and cause flow of the material around them, and effect folding-in of the steam. In an attempt to provide better mixing, the portion of the conduit containing the nozzles is enlarged. The result has been to create steam pockets in the material, without obtaining the desired mixing and distribution of the steam. Also, heat tends to build up in the material of the nozzles, which, when accumulated in the nozzles and conducted into the adjacent wall portions of the conduit, causes the food material to burn thereon. The result is that particles of the burned-on material flake off and are carried away with the product to end up in the containers along with the product. In addition, the conduit and nozzles are difficult to clean without removal of the conduit and complete disassembly of the nozzles. Also, in case of interruption in the steam flow, the pressure on the food material causes it to flow into the nozzles and clogs them up.

Based upon the premise that flow of a fluid under pressure through bends in a conduit produces transverse twin-eddy secondary flows, the present invention provides as its principal objects a method and apparatus for mixing the steam into the food material so as to avoid the above described difficulties; to assure a better distribution in the food material by turbulent action of the secondary flow; and to inject the steam without producing steam pockets or burn-on of the food material.

Other objects of the invention are to introduce steam into bends or elbows of the conduit, to utilize natural twin-eddy currents produced by curvature of the bends to get the steam into the product and effect distribution thereof, so that all of the material ultimately has the same degree of heat and moisture content; to provide a steam injector that terminates short of the passageway of the bend, so as to avoid retardation and reduction in flow capacity in the bends; to provide an injector having insulation means to insulate the material of the injector from the walls of the conduit, and thereby prevent accumulation of heat that causes burning-on of the food material, as well as precondensation of the steam; to provide insulating means that also serves the function of a packing; to provide the injectors with check means for automatically shutting off flow of the food material into the injector in case the automatic temperature controls shut down flow of steam to one or more injectors, or in case of failure or shutoff of the steam supply; to provide an injector that is self-cleaning; and to provide an injector having a relatively small surface area, thereby reducing heat loss and preventing condensation of steam in the injector.

In accomplishing these and other objects of the invention as hereinafter described, an improved method and injector apparatus is provided for introducing steam into mixture with a food material while under flow through a bend in a conduit, the preferred form of which is illustrated in the accompanying drawings, wherein:

FIG. 1 is a longitudinal section of one bend or elbow in a conduit through which a food material is under high pressure flow, and which bend or elbow is equipped with an improved steam injector having the features of the present invention, the check valve of the injector being shown in position to pass steam.

FIG. 2 is a similar view showing the check valve seated under pressure of the food material, to close flow of the food material into the steam supply pipe of the injectors to which the steam is shut down.

FIG. 3 is an end view of the injector as viewed from line 3—3, FIG. 2, and showing the plurality of steam orifices that are provided by a single injector.

FIG. 4 is a cross section through the injector on the line 4—4 of FIG. 1, showing the steam outlet orifices from the check valve side.

FIGS. 5 and 5-A are perspective views of the elbow with the injector removed therefrom and the parts of the injector in spaced apart relation, certain of the parts being shown in section to better illustrate their inner construction.

FIG. 6 is a diagrammatic view showing the twin-eddy secondary flow within the bend of a flow conduit.

Referring more in detail to the drawings:

1 designates a part of a conduit in which food material or mixture to be canned is continuously forced under superatmospheric pressure high enough to retain the mixture in liquid phase and to prevent fluctuation from the liquid phase to the vapor phase during the heating process. The food material is supplied with heat of steam directly injected as the material advances along the conduit at temperatures and pressures disclosed in the above mentioned Schack, et al. patent. The conduit may consist of a straight section of pipe long enough to provide the required travel and time in which the food material is brought to sterilizing temperature, or, for example, the conduit may consist of loops in which the straight sections are connected by bends 2 to form a continuous conduit of sufficient length in a minimum of space.

Preferably, the food material pumped into the conduit has less liquid content than the liquid required in the finished product, and the condensate of the injected steam makes up, or partially makes up, the liquid required. Consequently, the food material is rather compact, and it has been difficult to get the steam into the food material without experiencing the above described difficulties. It is important that the steam be injected and dispersed uniformly in the food material as rapidly as possible, so that all of the material is uniformly contacted by the heat of sterilization and that the ultimate condensate from the steam be uniformly distributed in the flow.

Following the theory that bends of large radius of curvature in closed passages cause a twin-eddy secondary flow (see Victor L. Streeter's Handbook of Fluid Dynamics, first edition, 1961, section 3, pages 21 and 22), I have discovered that such twin-eddy secondary flow furnishes sufficient turbulence, even though of comparatively limited duration, to enable highly satisfactory introduction of steam, and uniform distribution thereof into the food material.

The twin-eddy secondary flow of a continuously moving primary flow through a bend in a conduit is shown diagrammatically in FIG. 6 of the present drawings. It will be noted that the twin-eddy secondary flows (a) and (b) are continuous in opposite directions at the respective sides of the vertical diameter and outwardly from the inner curvature (c) of the bend 2, and move outwardly toward the side of larger curvature (d) and downwardly of the side walls (e) and (f) and back to (c). It is obvious that the turbulence brought about by the twin-eddies will start at near the entrance 3 of the bend and possibly reach its maximum halfway of the length of the bend, to gradually reduce toward the outlet end 4, where it decays as the flow enters a straight section 5 of the conduit. The section of conduit 6 connected to the inlet end 3 is dependent upon the form of the heater to get a desired number of elbows 2 into the conduit at which steam may be introduced.

While the steam could be ejected at the inlet end 3 of the bend 2, I find that the best results are attained where the turbulence is the greatest and where the steam is injected in the direction of movement of the eddies. Consequently, in the present illustrated instance, the steam is shown as being injected substantially midway of the bend and on the inner side thereof, to take full advantage of twin-eddy secondary flow and get the steam quickly and uniformly into the food product.

Therefore, as shown in FIGS. 1, 2 and 5, the bend 2 is actually an elbow fitting having a tubular wall providing a bend of desired radius and with the inlet and outlet ends 3 and 4 having means for connection with adjacent parts of the conduit. The actual connections may be any type, but since the parts must be readily disconnected and reconnected from time to time for cleansing purposes, and be steamtight, the parts making up the conduit have annular flanges 7 and 8, to be drawn together by band type clamps 9 (FIG. 1), suitable gasket rings 10 being inserted in grooves in the abutting faces of the flanges.

The elbow 2 is provided at a midpoint between the ends thereof and on the inside curvature 11 with an opening 12.

The injector of the present invention includes a nipple 13 that fits the opening 12 and is secured to the wall of the elbow, as by welding 14, to provide a leaktight joint, without the welded end of the nipple extending into the curved flow passageway 16 of the elbow. The opposite end of the nipple 13 has a flange 17 of a thickness to accommodate external threads 18 and a preferably inwardly tapered annular seat 19. It is here pointed out that the wall of the elbow, as well as the wall of the nipple which is welded thereto, are relatively thin to prevent, as much as possible, the accumulation of heat that might be conducted from the steam connections with the nipple 13. Also, to this end the nipple 13 is lined by a bushing 20 of insulating material, such as "Teflon" or the like. The bushing 20 has a tapered annular flange 21 with the taper thereof seating in the tapered seat 19 of the nipple, to provide a pressure-tight joint and to locate the inner end 22 of the bushing 20 outside of the flow passageway 16.

The injector also includes a nozzle 23 which is seated within the bushing. The nozzzle 23 is of novel construction and is designed to introduce a plurality of jets of steam into the flow passageway of the elbow without projecting thereinto, and contains a check means that closes off the steam inlet in case the steam pressure should fall below the pressure of the food material. The nozzle is characterized by its small size, and the component parts are such as to avoid accumulation of heat that may be conducted into the wall of the elbow, to cause burn-on of the food material. Another characteristic of the nozzle is the introduction of steam without reducing the flow capacity of the passageway 16 or blocking large pieces of food material, as when canning beef stew, hash, or the like. The small area of the nozzle reduces heat loss and prevents condensation of steam therein. Another characteristic of the nozzle is that it is self-cleaning of whatever food material gets into the check valve chamber.

The preferred form of nozzle 23 includes a tubular outer injector member 24 having a cylindrical wall 25 corresponding in length to the bushing 20 and of an outer diameter to slide thereinto. The member 24 has an annular head flange 26 provided with a seating face 27 that abuts the outer end of the bushing and which retains the tapered flange of the bushing seated in the nipple 13. The member 24 has a bore 28 that opens through the flanged end thereof, but terminates short of the inner end to provide an inwardly extending annular stop flange 29 encircling an axial opening 30. The inner face 31 of the stop flange is tapered toward the outlet 30 to center a ball check 32 within the bore 28 for distributing steam through a plurality of outlets 33. The outlets may be in the form of slots extending through the flange 29 and radially from the axial opening 30.

The nozzle 23 also includes a member 34 which has a cylindrical neck portion 35 that fits snugly within the bore 28 of the outer member 24, but terminates short of the flange 29 to provide a chamber 36 therebetween in which the ball check 32 is loosely retained between the stop flange 29 and an inwardly tapering annular seat 37 that is provided in the end of the neck 35 and which encircles an axial steam pasageway 38.

The ball check is of a diameter to seat centrally over the opening 30 and rest on the taper of the flange 29 in one position to pass steam, and to engage the seat 37 in another position to close off the steam passageway 38, as later to be described.

The opposite, or outer, end of the member 34 is of larger diameter to provide an annular shoulder 39 corresponding to the flanged end of the member 24 to clamp a gasket washer 40 therebetween. The washer 40 is also of heat insulating material, such as "Teflon," and also serves as a gasket. The outermost end of the member 34 is of slightly reduced diameter to provide an annular shoulder 41 opposite the shoulder 39. The outer end of the axial passageway 38 has a counterbore 43 and is internally threaded to connect a steam supply pipe 44.

The parts of the nozzle are retained in assembly and in connection with the nipple 13 by a union nut 45 having an inturned annular flange 46 to engage the shoulder 41 when the internal threads 47 of the union nut are connected with the threads 18 of the nipple 13.

The nozzles are assembled by inserting the ball check 32 in the bore 28 of the member 24. The relative sizes of the ball check and the diameter of the bore 28 are such as to provide an annular passageway around the ball check, as shown in FIG. 4, to pass the steam when the inwardly tapering face of the flange 29 guides the ball check in centered position over the opening 30. The washer 40 is sleeved upon the neck 35 of the member 34 and seated against the shoulder 39. The neck 35 is inserted within the bore 28 until the washer 40 engages the face 26 of the member 24. The union nut 43 is sleeved on the outer cylindrical portion of the member 34. Assuming that a nipple 13 has been welded in place on the elbow 2, the insulating bushing 20 is pushed into the nipple until stopped by engagement of the tapered flange 21 thereon engaging the tapered seat 19 of the nipple.

The assembled nozzle is then pushed into the insulating bushing 20 until stopped by the annular face 27 thereof engaging the end of the bushing 20. After engaging the threads 47 of the union nut 45 with the threads 18 of the nipple, the union nut may be tightened to draw the parts firmly into sealing engagement with each other, at which time the end 22 of the insulating bushing 20 and the injector member 24 are in registry slightly short of the inner surface of the elbow, so as to be just out of the flow path of the food material (see FIGS. 1 and 2). The steam supply pipe 44 is connected to the member 34. When the injector is thus assembled and installed, the tapered flange 21 of the insulating bushing cooperates with the insulating washer to seal the injector against leakage of steam and food material by way of the union nut.

Injectors may thus be connected at one or more bends or elbows 2 that may exist in the conduit or be installed therein.

Assuming that the food material is being pumped through the conduit 1 under superatmospheric pressure, and that steam is turned on to the injector or injectors, as the case may be, the food material flowing through the large curvature of the elbows in the closed passage of the conduit will have produced therein the twin-eddy secondary flow, which causes the turbulence which is used to distribute the jets of steam which are being emitted from the slots 33.

The steam pressure acting upon the ball check holds the ball check against the taper of the stop flange 29 and centered with respect to the check valve chamber 36, so that steam is distributed substantially equally through all of the slots 33, as shown in FIG. 3. The division of the steam makes it easier to distribute in the turbulent secondary flow of the food material. Also, there are no slugs of steam causing pockets within the food material.

Decay in the secondary flow can occur downstream, but the time it takes for the food product to travel the length of the bend is sufficient time for the steam to be uniformly distributed into the food material.

If the steam is shut off, the pressure of the food material acting upon the ball check 32 through the opening 30 moves the ball to the seat 37 and closes the passageway into the member 24, and prevents the food material from escaping into and clogging the steam pipes. The small amount of material that does enter the ball check chamber 36 is instantly blown out when the steam is again turned on. Thus, the injectors are self-cleaning.

Atttention is again called to the importance of insulating the bushing 20 and washer 40. It will be noted that the interposition of the bushing 20 between the nozzle and wall of the nipple prevents buildup of heat that may be conducted to the portions of the elbow immediately surrounding the injector, and prevents burn-on of the food material.

I claim:

1. An apparatus for providing heat of sterilization in a food material while in primary flow under pressure higher than atmospheric, said apparatus including:
    a continuous conduit for conducting said flow,
    a conduit section connected in said conduit and having an inner contour for producing a zone of turbulence in said flow incidental to said inner contour, and
    an injector connected with said conduit section to discharge steam into the zone of turbulence within said section, said turbulence facilitating distribution of said steam within the food material and in which said inner contour of said section is provided by a bend in the conduit having a radius of curvature for creating therein a twin-eddy secondary flow in the food material while moving through said bend, and in which said injection connected with said section discharges into the bend on a side thereof nearest the center of said radius of the bend to inject steam for distribution in the food material by turbulence created by the twin-eddy secondary flow.

2. An apparatus for providing heat of sterilization in a food material while in primary flow under pressure higher than atmospheric, as described in claim 1,
    in which said injector has a flow passageway for the steam provided with a check valve seat,
    a check valve stop spaced from said seat to provide a check valve chamber therebetween, and
    a check valve in said chamber to be moved from said seat to the stop by the flow of said steam and to seat by the pressure of the food material when the flow of steam is stopped, said check stop being positioned to encircle an axial opening for centering the check valve and having steam outlets around said opening for discharging steam in a plurality of jets directly into the conduit section.

3. An apparatus for providing heat of sterilization in a food material while in primary flow under pressure higher than atmospheric, as described in claim 1,
    in which the conduit section is an elbow having a radius of curvature for creating therein a twin-eddy secondary flow in the food material moving through said elbow and connecting adjacent sections of the conduit, said elbow having
    an opening on the side nearest the center of radius,
    a nipple fixed to the elbow at said opening,
    an insulating bushing lining the nipple and having an annular flange engaging in an annular seat of the bushing,
    and in which the steam injector includes a cylindrical member within the bushing and having a flange abutting the flanged end of the bushing to provide a seal,
    said cylindrical member having an inwardly extending stop,
    a member fitting within the cylindrical member and having an axial steam passageway provided with a ball check seat spaced from the stop to provide a ball check chamber therebetween, said member having means thereon abutting the flange of the cylindrical member,
    a ball check in the ball check chamber,
    a union nut having threaded connection with the nipple for retaining said members in assembly, and
    a steam supply pipe connected with the steam passageway of the last named member.

4. An apparatus for providing heat of sterilization in a food material while in primary flow under pressure higher than atmospheric, as described in claim 3,
    and including an insulating member between said abutting portions to cooperate with the insulating bushing to limit conduction of heat of the steam to the elbow.

5. An apparatus for providing heat of sterilization in a food material while in primary flow under pressure higher than atmospheric, as described in claim 1,
    in which the conduit section is an elbow having a radius of curvature for creating therein a twin-eddy secondary flow in the food material moving through said elbow and connecting adjacent sections of the conduit, said elbow having
    an opening on the side nearest the center of radius,
    a nipple fixed to the elbow at said opening without the nipple extending into the elbow,
    an insulating bushing lining the nipple and having an annular flange engaging in an annular seat of the bushing,
    and said steam injector includes a cylindrical member in the bushing having its inner end terminating at said opening in the elbow and having a flange on its outlet end abutting the flanged end of the bushing to provide a seal,
    said cylindrical member having an inwardly extending flange encircling an axial opening to provide a ball stop,
    a member fitting within the cylindrical member and having an axial steam passageway provided with a ball check seat spaced from the stop flange to provide a ball check chamber therebetween, said member having a stop shoulder abutting the flanged end of the cylindrical member, a ball check in the ball check chamber, said stop flange having spaced apart slots for passing a plurality of jets into the elbow when the ball check is covering said axial opening, a union nut having threaded connection with the nipple for retaining said members in assembly, and a steam supply pipe connected with the steam passageway of the last named member.

References Cited

UNITED STATES PATENTS

| | | | |
|---|---|---|---|
| 2,060,557 | 11/1936 | Davis | 99—251 XR |
| 2,103,427 | 12/1937 | Long | 137—533.11 XR |
| 2,492,635 | 12/1949 | Hawk | |
| 2,636,430 | 4/1953 | Brown et al. | 99—251 |
| 2,682,827 | 7/1954 | Gressly | 99—251 |
| 2,737,374 | 3/1956 | Terrett | 99—251 XR |
| 2,801,087 | 7/1957 | Hawk | 99—251 XR |
| 2,870,028 | 1/1959 | Anderson et al. | 99—251 XR |
| 3,156,176 | 11/1964 | Wakeman et al. | 99—251 |
| 3,182,975 | 5/1965 | Stewart | 99—251 XR |
| 3,247,862 | 4/1966 | Burke | 137—533.13 XR |
| 2,761,469 | 9/1956 | Hansen | 137—513.5 XR |

FOREIGN PATENTS

| | | |
|---|---|---|
| 790,969 | 2/1958 | Great Britain. |
| 84,880 | 4/1957 | Netherlands. |

WALTER A. SCHEEL, *Primary Examiner.*

J. M. NEARY, *Assistant Examiner.*

U.S. Cl. X.R.

99—216; 261—76; 137—539; 251—145